United States Patent [19]

Alexander et al.

[11] Patent Number: 4,842,522
[45] Date of Patent: * Jun. 27, 1989

[54] TRAINING SHOELACE

[76] Inventors: Dean D. Alexander, 5681 Edgecliff, Yorba Linda, Calif. 92686; James S. Stanfield, P.O. Box 1983, Santa Monica, Calif. 90406

[*] Notice: The portion of the term of this patent subsequent to Jan. 26, 2005 has been disclaimed.

[21] Appl. No.: 109,277

[22] Filed: Oct. 16, 1987

Related U.S. Application Data

[63] Continuation of Ser. No. 708,797, Mar. 6, 1985, Pat. No. 4,721,468.

[51] Int. Cl.⁴ .............................................. G09B 19/00
[52] U.S. Cl. .................................. 434/260; 24/143 R
[58] Field of Search ............... 434/260, 83; 24/30.5 T, 24/143 R, 143 A, 143 B; 132/47; 428/4, 5

[56] References Cited

U.S. PATENT DOCUMENTS

| 273,798 | 3/1883 | Baldwin | 24/143 A |
|---|---|---|---|
| 487,411 | 12/1892 | Wild | 24/143 R |
| 2,306,515 | 12/1942 | Wright | 24/143 R |
| 2,646,630 | 7/1953 | Miller | 434/260 |
| 2,869,205 | 1/1959 | Kacowski | 24/143 R |
| 2,973,597 | 3/1961 | Powell | 24/30.5 T |
| 3,256,129 | 1/1966 | Wallerstein | 428/5 |
| 3,857,139 | 12/1974 | Turner | 24/30.5 T |
| 4,017,984 | 4/1977 | Bonfigli | 434/260 |
| 4,247,967 | 2/1981 | Swinton | 24/131 R |
| 4,721,468 | 1/1988 | Alexander et al. | 434/260 |
| 4,764,119 | 8/1988 | Miraglia | 434/260 |

OTHER PUBLICATIONS

Coded Telephone Wire (Sample Enclosed) Circa 1976.
Fisher Scientific Co. Catalog 65, p. 1023 Wire, Copper, Flexible, Single Conductor.

Primary Examiner—William H. Grieb
Attorney, Agent, or Firm—Freilich, Hornbaker, Rosen & Fernandez

[57] ABSTRACT

A shoelace is described for use by young children or the handicapped, which facilitates tying of a bow. The shoelace has opposite end portions which are just stiff enough to substantially retain the shape to which they are bent while permitting children to easily bend them during the tying of a bow. This enables a child or handicapped person to bend the end portion to the shape required for one step of tying, and to "freeze" the shoelace in that position while he manipulates the other end portion or decides what is the next step to be done.

5 Claims, 1 Drawing Sheet

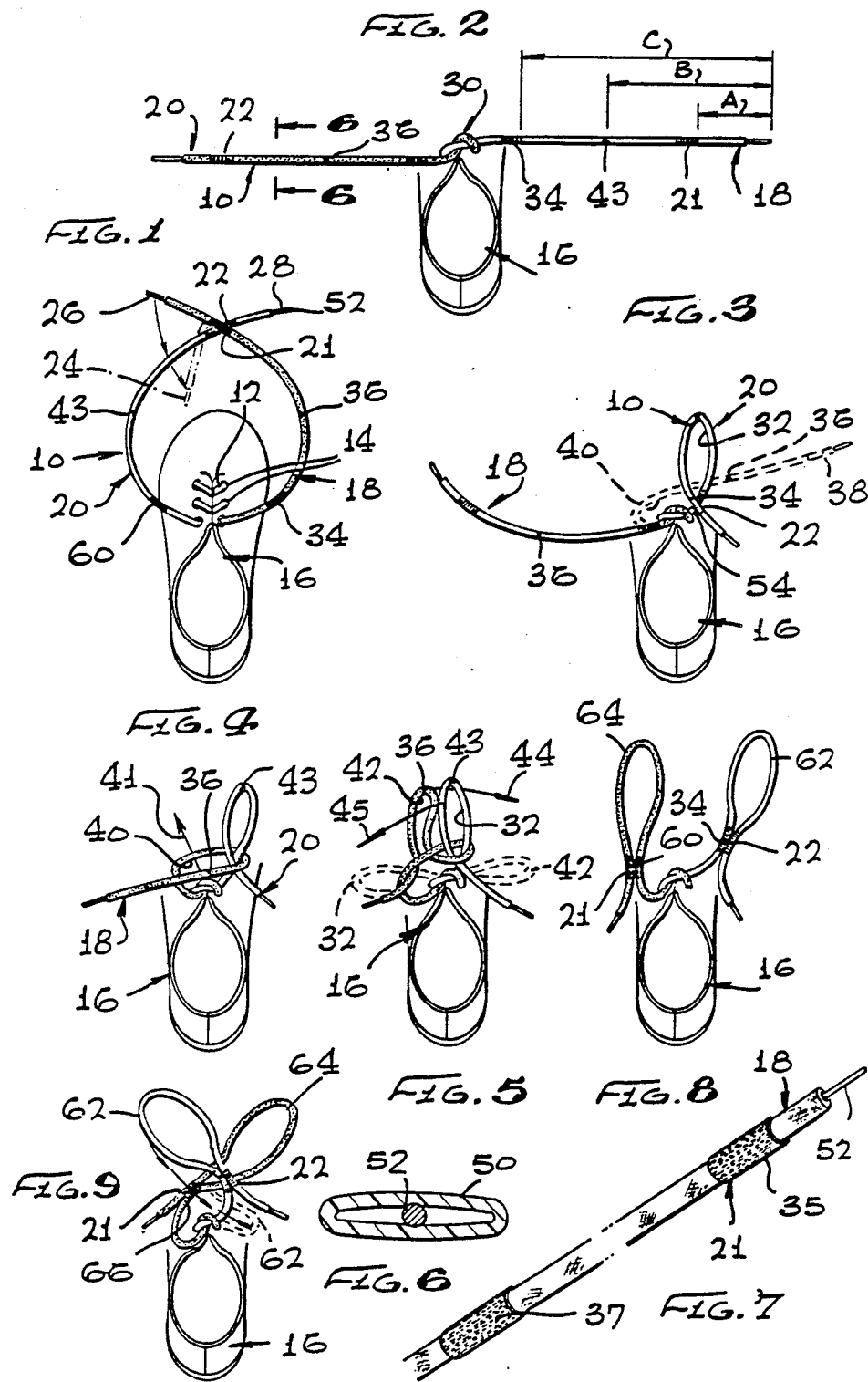

TRAINING SHOELACE

This is a continuation of application Ser. No. 06/708,797, filed Mar. 6, 1985, now U.S. Pat. No. 4,721,468.

BACKGROUND OF THE INVENTION

Young children and retarded persons often find great difficulty in tying their shoelaces into bows. The tying of a bow involves several steps in which the person's hands must grasp the laces, with the configuration of the laces being partially obscured and in a complex relationship. Markings can be placed on the free end portions of the laces to indicate how the laces are to be folded, with U.S. Pat. No. 2,646,630 by Miller showing one series of markings to aid in tying shoelaces. However, such techniques still require a person to grasp the laces throughout the tying sequence. A shoelace which facilitated the understanding of each of the steps by a person so that he could tie the lace slower and with less possibility of failure, would aid in teaching young children and the retarded to tie their shoelaces.

SUMMARY OF THE INVENTION

In accordance with one embodiment of the present invention, a shoelace is provided which facilitates the tying together of the end portions of the lace into a bow, by young children and retarded persons. The shoelace has opposite end portions that are each stiff enough to substantially retain the shape to which they are bent and unbent. However, the end portions are flexible enough to permit children and the retarded to easily bend the shoelaces during the tying of a bow with them. This enables a person to perform one of the sequence of steps required to tie a bow, such as the curling of a lace into a loop, and to then release the lace while it substantially retains the shape to which it has been bent. The person can then study the step to try to understand it and then go on to the next step without having to perform the earlier step again.

The shoelace with moderately stiff end portions can include markings that aid a person in performing at least some of the steps of tying a shoelace. This enables a person to bend the shoelace in accordance with the markings, and then release the shoelaces to study them. A means, such as Velcro (hook and loop fastener), can be provided on certain areas of the shoelace to retain portions of the shoelace together when they have been bent and pressed together. Thus, for example, two widely spaced markings can be placed on the end portion of the shoelace, which markings must be brought together to form a loop; one fastener can be attached to at least one of these markings so when the two markings are brought together, the fastener assures that they will stay together.

The novel features of the invention are set forth with particularly in the appended claims. The invention will be best understood from the following description when read in conjunction with the accompanying drawings.

BRIEF DESCRIPTION OF THE DRAWINGS

FIG. 1 is a rear perspective view of a shoe and lace, showing a first step in the tying of a bow;

FIGS. 2–5 are partial perspective views of the shoe and lace of FIG. 1, shown during progressively later steps in the tying of a bow.

FIG. 6 is an enlarged sectional view taken on the line 6—6 of FIG. 2.

FIG. 7 is a partial perspective view of the lace of FIG. 1.

FIGS. 8 and 9 illustrate steps in the tying of a shoelace into a double bow.

DESCRIPTION OF THE PREFERRED EMBODIMENTS

FIG. 1 illustrates a shoelace 10 of the present invention, with its middle portion 12 threaded through the eyelets 14 of a child's shoe 16, and with its opposite end portions 18, 20 extending from the topmost eyelet and positioned for the tying of a bow. Each end portion 18, 20 of the lace has a marking 21, 22 near its outer end, which indicates to a child or retarded person where the laces should cross in the beginning of the bow tying, with the first end portion 18 which is colored red, lying over the second portion 20 which is white. The red portion is then bent forward, down and around so its tip lies at the position 24. The extreme ends 26, 28 of the laces are then pulled to form the single interlacement 30 shown in FIG. 2.

As shown in FIG. 3, the next step is to form a loop 32 in the white loop portion (which is now on the right side), which is accomplished by bringing the outer marking 22 against an inner marking 34. The person then must shift his attention from the loop 32 to the red end portion 18 and bring a middle marked location 36 behind the loop as shown in the phantom lines at 38. The red end portion 18 is then turned in front of the white loop as shown in FIG. 4. The middle location 36 of the red end is then pushed down through a circle 40 in the red end, in the direction of arrow 41. As shown in FIG. 5, this results in a loop 42 in the red end. The person grasps the middle location at 36 of the red loop 42 in his left hand and the middle 43 of the white loop 32 in his right hand, and then pulls them in the directions of the arrows 44, 45. The finished bow is shown in phantom lines in FIG. 5.

Children and retarded persons often experience particular difficulty in carrying out two of these tying steps. One difficult step is in FIG. 3, after the bow 32 has been formed, when a person must shift his attention to grasping the red end portion 18 to bend it behind the loop. If the loop is released, then the child will be frustrated. To prevent this, at least the white end portion 20 of the lace is constructed so it is stiff to substantially retain the loop shape to which it is bent, but with the stiffness being low enough to permit children and retarded persons to easily bend the end portion during subsequent steps in the tying of the lace. Such stiffness can be achieved by using an ordinary shoe lace shown in FIG. 6, which includes a woven sheath 50, and by including a metal wire 52 as of copper within the sheath to stiffen it. The copper wire 52 should have a thickness or diameter of at least about 10 mil (one mil equals one thousandth inch) to provide sufficient stiffness, but should not be of greater diameter than about 40 mil or it will hamper subsequent bow tying steps. Any other metal stiffeners should have a diameter within this range.

A relatively low stiffness will hold a largely loop shape at 32 (FIG. 3), but the ends of the loop will separate. To prevent such separation so as to retain the loop shape, at least one of the markings 34 is formed with means for retaining it to the other marking 22. Applicant sews a Velcro loop pad 35 (FIG. 7) of dark color to the woven lace to form the marking 22 and sews a dark Velcro hook pad 37 to the lace to form the marking 34. Other means such as adhesive on one of the markings can be used as a fastening or retaining means. The combination of the moderately stiff lace to hold a loop shape, with only the inner end of the loop at 54 supported and with the rest of it being unsupported by any solid object, and the Velcro fasteners or other retaining means for retaining the marked portions 22, 34 in engagement, enables a child to release the loop while grasping the other end of the lace, without the loop falling and frustrating the person.

Another step which children and retarded persons often find to be difficult, is in the transition between the steps of FIGS. 4 and 5, when a person must release the loop 42 after pushing it, and then grasp it and the other loop 32 to pull them in opposite directions. By making both end portions of the lace moderately stiff, the person can release them and still be able to grasp them again without the partial bow falling apart. At almost any part of the tying process, the person can release the laces, and the stiffness of the laces will "freeze" or retain their positions to enable the person to see how the tying process is progressing and to enable him to again grasp the places to continue the tying process.

In the lace of FIG. 1, the marking 21 is spaced a distance A of about 3 inches from the tip of the lace, the marking 36 is spaced a distance B of about 6½ inches from the end, and the marking 34 is spaced a distance C of about 9 inches from the end.

FIGS. 7 and 8 illustrate an alternative set of steps involved in the tying of a double bow. In this case, the two markings 22, 34 and 21, 60 on the two lace end portions are brought together to form two bows 62, 64. One of the bows 62 is then threaded through the space 66 lying under the bows when they are crossed as in FIG. 8.

Although a variety of markings can be used, applicant has marked laces by coloring most of the end portion 18 red and most of the left portion 20 white. The outer and inner markings 20, 21 and 34, 60 have been black, with each pair such as 21, 34 spaced about six inches apart. The middle markings 36, 43 have been stars.

Applicant has composed a poem to guide a learner through a seven step shoe tying sequence as shown in FIGS. 1-5, which is as follows:

Red over white, pinch them tight
Over we roll, and back through the hole
Now pull them through, I'm tying my shoe.
Make a white bunny ear, and squeeze it right here.
Over we roll, the star stops at the hole.
Push through the star, but don't push too far.
Now pull the stars through, I've just tied my shoe!

The Brigance Diagnostic Inventory of Basic Skills (Albert Brigance, Curriculum Associates, 1976) indicates that shoe tying is typically acquired during the child's fifth year. To date, the youngest children tested with shoelaces of the type described above, have been of ages 3 years, 2 months, 3 years, 8 months and 3 years, 8 months. All three of these children became independent shoe tiers within 35 minutes of training. This is considerably earlier than the expected ages for learning this skill. Of seven children who have demonstrated independent shoe tying with applicant's laces, none have been able to transfer their skill directly to floppy laces without additional practice. These children show full knowledge of the steps required and can often describe what they are attempting to do, but they lose control of the laces. Children who are tested who can independently tie floppy laces, have all been able to tie applicant's laces. Applicant also has been successful in teaching retarded people to tie bows, who have been unable to do so with floppy laces.

Thus, the invention provides a shoelace for use by young children or those handicapped by mental retardation, which, after being threaded through the eyelets of a shoe so its opposite end portions are free for tying a bow, facilitates the tying of the bow. This can be accomplished by constructing at least the opposite end portions so that they are stiff enough to substantially retain the shape to which they are bent and unbent, but which each resists bending and unbending with a low enough resistance to permit a person to easily bend the shoelaces during the tying of a bow with them. The shoelaces can include marked regions, and can include means such as Velcro pads for retaining together a pair of marked areas brought together to form a bow. A pair of markings can be placed near the inner and outer end of the end portion, and a distinctly different marking can be placed at the middle.

Although particular embodiments of the invention have been described and illustrated herein, it is recognized that modifications and variations may readily occur to those skilled in the art and consequently, it is intended that the claims be interpreted to cover such modifications and equivalents.

What is claimed is:

1. A shoelace for use by young children or the handicapped which, after being threaded through the eyelets of a shoe so its opposite end portions are free for tying a bow, facilitates the tying of the bow, comprising:
   a shoelace which has an end portion which includes a pair of markings spaced apart by a plurality of inches so when the shoelace locations which are marked are brought together they form a loop which is useful in typing a bow, said shoelace being devoid of additional markings identical to said pair of markings and that are spaced less than an inch apart, said end portion being stiff enough to substantially retain the loop shape when the marked locations are brought together, but said end portion being flexible enough to permit a child to tie a bow with said looped end portion and the opposite end portion of the shoelace.

2. The shoelace described in claim 1 wherein:
   said marked end portion is stiff enough to retain itself in a looped configuration with only one end supported and the rest unsupported.

3. A combination shoe and shoelace for use by young children or the handicapped which, after the shoelace is threaded through the eyelets of a shoe so its opposite end portions are free for tying a bow, facilitates the tying of the bow, comprising:
   a shoe having eyelets for passing a shoelace;
   a shoelace threaded through the eyelets of said shoe, and which has opposite end portions that are each stiff enough to substantially retain the shape to which they are bent and unbent, but which each resists bending and unbending with a low enough resistance to permit children to easily bend the shoelace end portions during the typing of a bow with them.

4. The combination described in claim 3 wherein:
   each of said end portions is stiff enough to retain itself in a looped configuration with only one end of the loop supported and the rest of the loop unsupported.

5. The combination described in claim 4 wherein:
   said shoelace includes a fabric body and a bendable metal wire within the fabric body.

* * * * *